July 4, 1967   L. H. MAURER   3,329,031
TORQUE CONVERTER

Filed Sept. 8, 1964   2 Sheets-Sheet 1

INVENTOR.
LEON H. MAURER
BY
*Smith & Mattern*
ATTORNEYS

July 4, 1967
L. H. MAURER
3,329,031
TORQUE CONVERTER
Filed Sept. 8, 1964
2 Sheets-Sheet 2
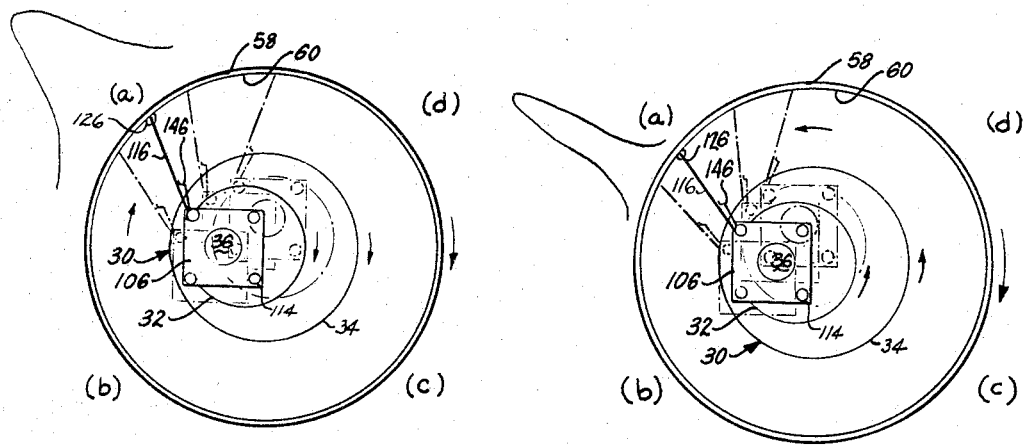
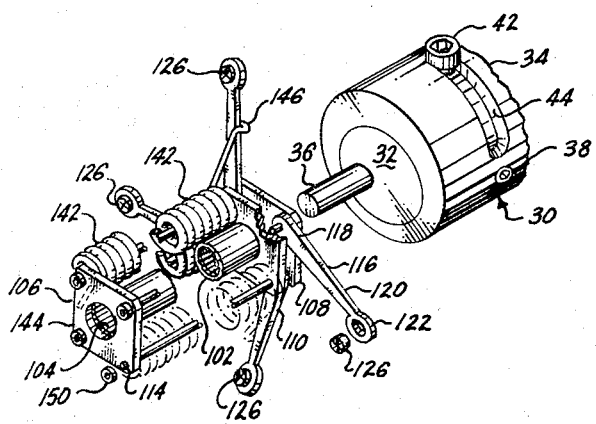
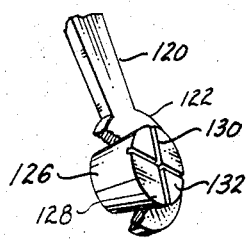
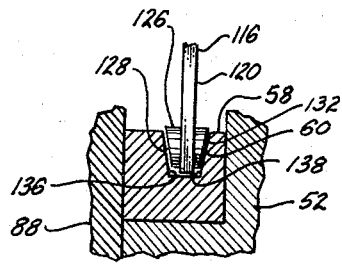
INVENTOR.
LEON H. MAURER
BY
Smith & Mattern
ATTORNEYS

Patent

3,329,031
TORQUE CONVERTER
Leon H. Maurer, 15650 42nd Ave. S.,
Seattle, Wash. 98188
Filed Sept. 8, 1964, Ser. No. 394,989
8 Claims. (Cl. 74—112)

This invention relates to mechanisms used to convert torque and particularly to mechanisms useful in driving machine tools wherein their originating power is produced in substantially constant speed motors.

The purpose of this invention is to provide at each machine tool a mechanism which is easily adjusted by a machine operator to convert the torque of power it receives, for example, from a constant speed electric motor, to meet a wide range of demanding operating speeds and torques for various tooling operations.

Objectives attained in accomplishing this purpose are:

Power output of this torque converting machine is available at its outer circumference from a rotation member which is a V pulley belt or comparable structure;

Overall unit size of each torque converting mechanism is kept limited in size to be conveniently attached to respective machine tools without or with little alteration to them or their supports;

Speed variations of these torque converters may be adjusted very quickly by a machine operator;

Rotation of all torque converting mechanisms continues in a given direction even though any originating power unit's rotation may be reversed. However, such reversal of direction will bring about a change in each torque converting mechanism's range of effective output drive revolutions per minute; and Long operating life of each torque converting mechanism is obtainable, and when service and repairs become necessary, they may be undertaken conveniently and at comparatively lower costs.

The invention is a torque converting mechanism, comprising:

(a) An input shaft assembly which is adaptable for attachment to an output shaft of a power unit such as a constant speed electric motor and which also is adjustable to rotate a crank pin or shaft at various selected eccentricities from a zero to maximum offset;

(b) A rotatable housing equipped with or to receive power take-off structure and to rotatably receive the input shaft assembly and other radially larger components of the torque converting mechanism;

(c) An internal circumferential guiding structure within the housing added to or forming a part thereof;

(d) A rotatable, attachable end closing structural assembly adjacent the guiding structure to close the internal volume it defines in conjunction with the rotatable housing, this rotatable end closing assembly including a radial closing structure, an inner centered guiding non-rotatable anchoring structure relatively rotatably secured to this radial closing structure, and outer projecting anchorable structure which is preferably a part of the inner anchoring structure and also relatively rotatably secured to this radial closing structure, and a surrounding attachment closing structure of this end closing assembly attached to or part of the radial closing structure to mate with the rotatable housing where it is enlarged to receive other components of the torque converter;

(e) An oscillating cranking assembly, being principally these other components located within the internal volume defined by the rotatable housing and its attached end closing assembly, movably mounted on the rotatable crank pin or shaft and confined to oscillatory movement by a relatively movable attachment means connecting this oscillating cranking assembly to the inner centered guiding non-rotatable anchoring structure which is itself adapted to be held secured by any selected auxiliary means, and included in this oscillating, cranking assembly are pivotally mounted return force biased cranking arm units which periodically generate driving forces against the inner guiding structure to rotate the housing and its power take-off structure at selected speeds that are initially determined by setting the eccentricity adjustment of the input shaft assembly of this torque converting mechanism;

(f) means to adjust and to maintain the eccentricity;

(g) means to hold the entire torque converting mechanism together;

(h) means to mount the torque converting mechanism; and, when necessary, (i) means to power the mechanism in its operating environment.

This invention in a preferred embodiment is illustrated in the accompanying drawings, wherein:

FIGURE 3 is a schematic and graphic view to illustrative relative movements and their effects of some torque converting components when rotation of the input shaft is clockwise;

FIGURE 4 is a schematic and graphic view like FIGURE 3; however, rotation of the input shaft is counterclockwise;

FIGURE 5 is a partially exploded and fully perspective view of both the input shaft assembly which is eccentrically adjustable and of the cranking assembly, some components being broken away or shown in dotted lines;

FIGURE 6 is a partial view in cross section of the inner guiding structure positioned between the adjacent housing and housing closing structures and guiding a cranking unit; and FIGURE 7 is a partial perspective view of a clutch insert in one end of a cranking-clutching arm of the cranking assembly.

CONSTRUCTION AND ASSEMBLY

Figure 1:
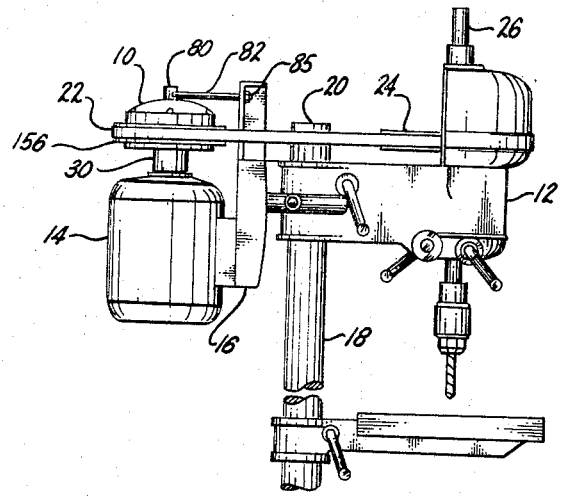
FIGURE 1 is a partial side elevation of a drill press equipped with the torque converting mechanism.

In FIGURE 1, a selected machine 12 tool, a drill press, is shown equipped with the invention 10, a torque converter, which is operated in this installation to modify the constant speed power output of the drill press, powered by its electric motor 14. An auxiliary framing 16 supports both electric motor 14 and torque converter 10 at a spaced distance from top 20 of drill press column assembly 18. A drive belt 22 is positioned about both torque converter 10 and a pulley wheel 24 secured to spindle 26 of drill press 12. Power generated by electric motor 14 is in this installation modified by torque converter 10 to drive drill press 12 under various operational conditions. Other illustrated, but not numerically designated, components in FIGURE 1 are all of drill press 12. Their inclusion depicts this optionally selected environment for this preferred embodiment of the invention; however, they have no direct association with specific driving and driven machine tool components which are pertinent to the understanding of the invention.

Figure 2:
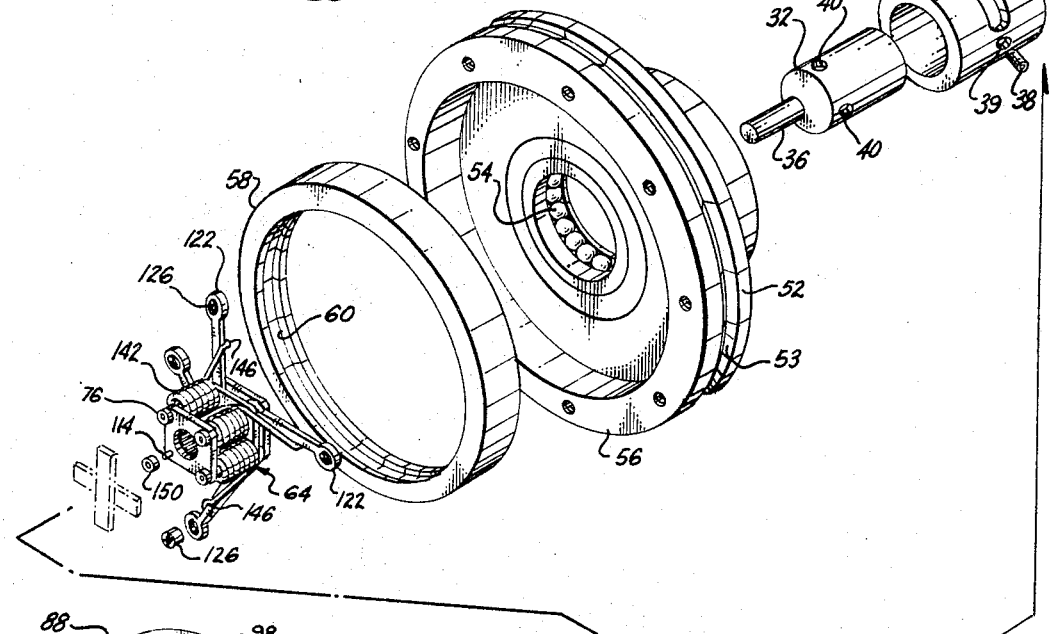
FIGURE 2 is an exploded and perspective view with many components spaced apart and all components orientated along a broken reference center line.
Figure 2:
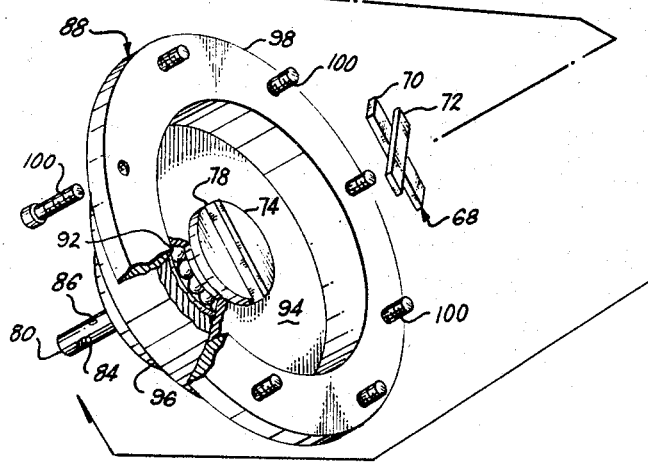

In FIGURE 2, the preferred embodiment of torque converter 10 is illustrated with its components generally spaced apart. Input shaft assembly 30, also shown assembled in FIGURE 5 is secured to output or driving shaft (not shown) of electric motor 14 and rotates at motor speed. Complementary inner shaft 32 and hollow outer shaft 34 of assembly 30 are relatively turned until eccentric projecting shaft 36, preferably part of shaft 32, is sufficiently offset to produce a needed eccentric movement. At such predetermined relative position, set screw 38, centered in hole 39 of outer shaft 34, is tightened against shaft 32 to maintain this selected eccentricity. To facilitate this eccentricity adjustment, a finger lever 42, shown as a capped and threaded pin 42, is secured to inner shaft 32, alternately in holes 40, and selectively moved through a maximum arc defined by slot 44 in hollow outer shaft 34.

This input shaft assembly 30 is positioned to project into and yet to remain partially extended from a power output rotatable housing 52 which has a circumferential drive belt groove 53. A roller bearing 54 is provided to accommodate relative rotation between housing 52 and outer shaft 34.

Spaced around projecting, eccentric or crank shaft 36 of input shaft assembly 30, as thus positioned within housing 52, is an inner guide structure 58 snugly mating and forming a part of the inside of housing 52 to present an inner guiding circular groove 60.

Thereafter, positioned on crank shaft 36 and aligned with groove 60, is an oscillating cranking assembly 64, which is also shown in FIGURE 5. As indicated in FIGURE 2, an interengagement lug 68 relatively slides in each of two directions, perpendicular to one another, with respect to both oscillating cranking assembly 64 and inside or inner formed anchoring structure 74. As each of interengagement lug 68 respective cross bars 70, 72 are positioned, bar 70 being located between confinements 76 on assembly 64 and bar 72 being located in slot or groove 78 any resulting motion of cranking assembly 64 is thereafter assured to be oscillatory rather than purely rotative upon rotation of crank shaft 36.

Inside or inner anchoring structure 74 is joined to or is made a part of aligned outer anchoring structure 80. This resulting overall anchoring structure 86 is held against rotation by anchor arm 82 as shown in FIGURE 1. One end of anchor arm 82 is inserted in hole 84 of outer anchoring structure 80 and its other end is secured to auxiliary framing 16 by threaded fastener 85, as shown in FIGURE 1.

As illustrated in FIGURE 2, alignment and positioning of anchoring structures 74, 80 is undertaken by utilizing a rotatable and attachable end closing structural assembly 88, which is joined to rotatable housing 52 to define an interior protected space about both inner guide structure 58 and cranking assembly 64. This closing structural assembly 88 has radial end closing structure 94 which in turn has an added or integral inner central cylindrical structure 96 to hold a roller bearing 92 which surrounds part of the length of combined anchoring structures 74, 80, which are preferably a continuous anchoring structure 86. Also as a part of or added to the radial end closing structure 94, there is an outer, cylindrical structure 98 which further defines the interior of torque converter 10 and, in addition, serves as a flange, complementary mating a like diameter outer cylindical flange structure 56 on rotatable housing 52. Upon assembly, these two mating flanges 56 and 98 are held together by machine bolts 100.

The rotary power of motor 14 is first transformed by adding eccentric motion within input shaft assembly 30. Thereafter, continuing transformation of eccentric rotary power is handled within cranking assembly 64, as shown in FIGURES 2 and 5. This latter assembly 64 has a central cylindrical body 102 to hold a roller or needle bearing 104, which receives projecting, eccentric or crank shaft 36 of input shaft assembly 30. Secured to body 102 are end plates 106, 108 and an interpositioned plate 110, located nearer plate 108. All these plates are arranged perpendicular to the axis of body 102.

Four captive pivot pins 114 are radially spaced around and arranged parallel to body 102 and secured to radial plates 106, 108 and 110. Between plates 108 and 110, four cranking-clutching arms 116 are pivotally assembled with and held by these captive pins 114. Each cranking-clutching arm 116 is alike; commencing at pin 114 with a circular bearing structure 118; having an extending arm 120; and terminating in a larger circular bearing structure 122.

This latter bearing structure 122 receives a clutch glide follower insert 126 which freely turns within this bearing structure 122 and contacts circular groove 60 of inner guide structure 58 in the assembly. Each clutching insert 126 is preferably made from a cylindrical form which is cut across on an angle at two locations forming non-parallel end surfaces. Each end surface 128, 132 has lubrication recesses 130 which provide lubricant flow paths during torque converter operations. Upon each power stroke, these recesses 130 provide escape routes for the lubricant to allow rapid seating of follower inserts 126 in groove 60.

At all operating times, only clutching inserts 126 contact circular groove 60 and the latter preferably has at least one side at an angle, both sides 136, 138 being shown at an angle in FIGURE 6. For example, such an angle of ten degrees has been found to be very good both to insure a quick gripping action during a powerful cranking stroke and to insure a quick releasing action during repositioning movements of cranking-clutching arms 116 in a torque converter as illustrated. At all times during their movements, arms 116 clear inner guide structure 58.

Working positions of cranking-clutching arms 116 are always maintained by employing resilient members such as coiled springs 142, in addition to their captive pivot pin 114 mountings. Each spring 142 is held captive about a pin 114 between plates 106 and 110. One spring end 144 is kept from turning, for example, by body 102 and the other spring end is formed with an extending hook 146 which grips cranking-clutching arm 116 at a spaced distance from its bearing end 118.

These springs 142 and arms 116 are removable after withdrawal of captive pivot pins 114 which are preferably threaded (not shown) into place. Each pin 114 projects beyond end plate 106 to receive a roller 150. The four rollers 150, so arranged, serve as low friction restrictive guide posts or confinements 76 confronting interengagement lug 68. Thereafter, oscillatory movement of lug 68 occurs when it engages both inner anchoring structure 74 and cranking assembly 64 and also oscillatory movement of the latter about crank shaft 36 is assured.

OPERATION

As thus constructed, assembled and installed in a selected environment, as illustrated in FIGURE 1, torque converter 10 increases the selectivity or versatility of each machine tool 12 powered by a motor 14 indirectly driving through the torque converter 10. To better understand such versatile power conversion, refer to FIGURES 3 and 4, wherein principal motions of key members are schematically indicated.

Motor 14 input can be indirectly applied to input shaft assembly 30 in either a clockwise direction, as shown in FIGURE 3, or in a counterclockwise direction as shown in FIGURE 4. Yet, resulting power takeoffs will remain in a clockwise direction, as indicated by rotation of inner guide structure 58, whose rotation is identical to that of both housing 52 and its preferable outer V belt pulley structure 156 shown in FIGURE 1, or its drive belt groove 53 shown in FIGURE 2. The power impulses occur in the same "firing order" as indicated by (a), (b), (c) and (d).

As indicated in FIGURES 2, 3 and 5, crank shaft or pin 36 is moved into an eccentric position as inner and outer shafts 32, 34 of input shaft assembly 30 are moved relative to one another and then non-rotatably secured together using finger lever 42 and set screw 38. Until so moved from a centered position, crank pin 36 will not be effective in creating any oscillatory motion of cranking assembly 64. As eccentricity increases, driving speed increases of inner guide 58.

Where rotary motions are clockwise, as indicated in FIGURE 3, a range of output revolutions per minute is comparatively limited in contrast to a range of output revolutions per minute obtainable where rotary motions are both clockwise and counterclockwise, as indicated in FIGURE 4. In one installation a maximum 550 r.p.m. occurred where rotary motions were clockwise and a maximum 900 r.p.m. occurred where rotary motions were both counterclockwise and clockwise under the same power source and working load conditions. Yet, as indicated by graphic curves in both FIGURES 3 and 4, respectively, the duration of a usual working pulse of each clutch-glide-follower insert 126 and its cranking-clutching arm 116 is longer, as shown in FIGURE 3, than as shown in FIGURE 4. Therefore, if rotary motions are clockwise, comparatively longer working, less intense, and slower speed output takeoff powers are made available by the torque converter 10 in driving a machine tool 12 to accomplish a machining operation.

Conversely, where input power at the same speed and energy level of motor 14 is applied in a counterclockwise direction to torque converter 10, in powering the machine tool 12 for an identical job, shorter working, more intense and higher speed output take-off powers are made available in driving a machine tool 12 to accomplish the same machining operation at hand.

To understand further these distinctions in speed and work outputs, consider movements of a cranking-clutching arm 116. Its end 118 moves with captive pins 114 pivoting about them. Each pin 114 and consequently each arm end 118 creates a circular path either clockwise or counterclockwise, which is not centered within inner guide structure 58. Therefore, the distance at any moment between a captive pin 114 and inner guide structure 58 varies between a maximum and a minimum. Each cranking-clutching arm 116, resiliently biased, must keep its follower 126 in contact with inner guide structure 58 during all operations, i.e., its driving motion and return motion. Therefore, arm 116 and its follower 126 must be always slightly greater in their combined length than any maximum distance ever to be realized between a captive pin 114 and inner guide structure 58. Yet, during torque converter operations as this same distance is minimized, causing arm 116 and follower 126 to reactively escape and so drive inner guide 58, if their combined length exceeds too greatly this maximum clearance limitation, the working stroke is impaired. Therefore, each overall length of cranking-clutching arm 116 and its associated clutch-glide follower insert 126 is astutely determined in every torque converter 10.

Where, as in FIGURE 3, the overall mechanical advantage is higher and rotary movements are clockwise, the reactive-escape-forces produce, in turn, driving impulses which are collectively greater in resulting work done, but are not as intensive as those driving impulses produced by the created reactive-escape-forces occurring when not all rotary movements are clockwise, as in FIGURE 4. In FIGURE 3, when arm 116 is taking part in producing another driving impulse, the distance between confinement 76, or captive pin 114, and inner guide 58 is smaller than when a driving impulse is occurring in FIGURE 4. The resulting angular positions of such further confinement account for larger resulting work done at lower maximum intensity and hand in hand slower speeds, whereas, in FIGURE 4, the angular positions account for lower resulting work done but at higher maximum intensity.

ADAPTATIONS TO SPECIFIC ENVIRONMENTS

Multiple belt position drives

As noted in FIGURE 1, the configuration of the drill press indicates how it was formerly equipped with multiple positions for its belt drive. That is to say, driving speeds of the drill press spindle were altered by selective drive belt positions around pulley wheel sets located in horizontal planes, one above the other.

If, therefore, more selective ranges of driving speeds were desired, additional drive belt structures (not shown), like 156, could be provided on torque converter 10, each having its belt grooves 53 of various diameters paired off with variable diameter pulley wheels secured to a drill press spindle. In this way, each major former speed range of a machine tool is maintained and further modified within that range by the functioning or torque converter 10.

Direct drive or lock out of torque converter function

As will be realized, torque converter 10, in accomplishing its selective conversions of motor power does consume some power. Therefore, on occasions where maximum power is desired, an operator of a machine tool may want, in effect, a direct drive. To acquire an equivalent direct drive, torque converter 10 is modified (not shown) so all its components rotate together at whatever motor speed is available. Such modification is accomplished by locking together its housing 52 and input shaft assembly 30 or by some equivalent by-passing of the function of its internal components. When so locked, motor 14 drives torque converter 10 just as though it were a pulley wheel. In this way, machine tool 12 is again operated without benefit of torque modifications made possible by driving through torque converter 14.

Control changes during continuous operating periods

Eccentricity changes, as shown in FIGURES 2 and 5, are made for adjusting the eccentricity of eccentric shaft 36 of input shaft assembly 30. These illustrated provisions, necessarily, may be adjusted only when motor 14 is stopped. Therefore, when control changes of torque conversion are desired, additional components (not shown) are necessary, some being used in lieu of those shown, to change the eccentricity and, consequently, the manner of torque conversion while motor 14 and machine tool 12 continue to be operated. To accomplish this "in motion control adjustment," a shifting ring and its respective control yoke are used to move inner shaft 32 relative to hollow outer shaft 34 to change the overall eccentricity of input shaft assembly 30.

Direct drive adjustment, or lock out, of the torque converter 10, likewise, is undertaken by using alternately operated braking-clutching mechanism (not shown) for withdrawing the restraint on anchoring structure 86 and directly connecting, as necessary, housing 52 to input shaft assembly 30. To again return to torque converter 10 operations, the restraints are recycled so anchoring structure 86 is kept from rotating and housing 52 is not directly connected to input shaft assembly 30.

This torque converter, with or without these "in motion control adjustments" having the potential of these clockwise and counterclockwise distinguishable energy conversions, wherein each energy conversion has a further selective range of power take-offs, serves as a necessary and vital addition to machinery, wherever and whenever such increased selectivity or versatility is desired and specified.

I claim:
1. A torque-converting mechanism, comprising:
 (a) an input shaft assembly which is adaptable for attachment to a power unit and which is also adjustable to rotate its self-contained crank pin at various selected eccentricities;
 (b) a rotatable housing equipped with power take-off sembly comprising: a body having a bearing structure, the latter receiving the input shaft assembly;
 (c) an oscillating cranking assembly movably mounted on the self contained crank pin of the input assembly and slidably controlled by the inner guiding structure of the rotatable housing, the said cranking assembly comprising: a body having a bearing structure to encompass the self contained crank pin; and resiliently biased cranking arm units which are pivotally secured to the body and which at their opposite ends from such pivotal mounting are equipped with removably fitted inserts to serve as the cranking arm units only places of contact with the inner guiding structure of the rotatable housing, upon oscillatory movement of the body resulting in periodically generating driving forces against the inner guiding structure causing rotation of the rotatable housing and its power take off structure;

(d) an anchoring structure restricting the cranking assembly to oscillatory movement upon eccentric motions of the crank pin.

2. A torque-converting mechanism, as claimed in claim 1, wherein the inserts of the cranking arm units have lubricant flow path structures on their contacting surface structures which move into and out of driving engagement with the inner guiding structure of the rotatable housing.

3. A torque-converting mechanism as claimed in claim 1, wherein the inner guiding structure of the rotatable housing has groove sides that are made on an angle to receive and to permit secure gripping of the inserts of the crank arm units in the inner guiding structure and also to insure their low friction quick release therefrom during their return motion in preparation for a follow-on driving motion.

4. A torque-converting mechanism, as claimed in claim 1, wherein the removably fitted inserts of the cranking arm units have tapered surfaces which contact the inner guiding structure of the rotatable housing.

5. A torque-converting mechanism, comprising:
(a) an input shaft assembly which is adaptable for attachment to a power unit and which has at least two members which are eccentric and rotatable to one another with one of the two members having an off-center crank pin and settable controls of this assembly to move and to hold one eccentric member relative to the other eccentric member as they rotate with the crank pin which is thus positioned at a selected eccentricity;
(b) a rotatable housing equipped with power take-off structure, inner guiding structure formed as a groove structure, and bearing structure to receive the input shaft assembly;
(c) an oscillating cranking assembly movably mounted on the self contained crank pin of the input assembly and slidably controlled by the inner guiding structure of the rotatable housing, the said cranking assembly comprising: a body having a bearing structure to encompass the self contained crank pin; and resiliently biased cranking arm units which are pivotally secured to the body and which at their opposite ends from such pivotal mounting are equipped with removably fitted inserts to serve as the cranking arm units only places of contact with the inner guiding structure of the rotatable housing, upon oscillatory movement of the body resulting in periodically generating driving forces against the inner guiding structure causing rotation of the rotatable housing and its power take off structure;
(d) an anchoring structure restricting the cranking assembly to oscillatory movement upon eccentric motions of the crank pin.

6. A torque-converting mechanism, as claimed in claim 5, wherein the sides of the grooved structure are on an angle to securely grip the inserts of the crank arm units and also to insure their low friction quick release and return motion in preparation for a follow-on driving motion, and wherein the removably fitted inserts of the cranking arm units have tapered surfaces which contact the grooved inner guiding structure of the rotatable housing.

7. A torque-converting mechanism, as claimed in claim 6, wherein the inserts of the cranking arm units have lubricant flow path structures on their tapered contacting surfaces which move into and out of driving engagement with the grooved inner guiding structure of the rotatable housing.

8. A torque-converting mechanism, comprising:
(a) an input shaft assembly which is adaptable for attachment to a power unit and which has at least two members which are eccentric and rotatable to one another with one of the two members having an off-center crank pin and settable controls of this assembly to move and to hold one eccentric member relative to the other eccentric member as they rotate with the crank pin which is thus positioned at a selected eccentricity;
(b) a rotatable housing equipped with power take-off structure, inner guiding structure and bearing structure, the latter receiving the input shaft assembly;
(c) an oscillating cranking assembly movably mounted on the crank pin of the input assembly and slidably controlled by the inner guiding structure; and
(d) an anchoring structure restricting the cranking assembly to oscillatory movement upon eccentric motions of the crank pin, such anchoring structure being adaptable for attachment to structure having continuity with the power unit and such anchoring structure including an interengagement member which is of an axially offset cross design with one cross member slidably confined to the anchoring structure and the other cross member slidably confined to the oscillating cranking assembly to convert the otherwise rotary motion of the cranking assembly to oscillatory motion.

References Cited

UNITED STATES PATENTS

| | | | |
|---|---|---|---|
| 290,901 | 12/1883 | Marchand | 74—600 |
| 1,832,382 | 11/1931 | Hall et al. | 74—117 |
| 1,843,083 | 1/1932 | Hall | 74—117 |
| 2,014,954 | 9/1935 | Sheridan | 74—112 |
| 2,521,067 | 9/1950 | Kenison | 74—117 |
| 2,973,653 | 3/1961 | Riedl | 74—117 |
| 3,188,173 | 6/1965 | Vowell et al. | 74—600 X |

FRED C. MATTERN, Jr., *Primary Examiner.*

DAVID J. WILLIAMOWSKY, *Examiner.*

F. E. BAKER, W. S. RATLIFF, *Assistant Examiners.*